US008624834B2

(12) United States Patent
Kim

(10) Patent No.: US 8,624,834 B2
(45) Date of Patent: Jan. 7, 2014

(54) DISPLAY APPARATUSES AND METHODS OF DRIVING THE SAME

(75) Inventor: Jung-woo Kim, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 739 days.

(21) Appl. No.: 12/585,278

(22) Filed: Sep. 10, 2009

(65) Prior Publication Data

US 2010/0091049 A1 Apr. 15, 2010

(30) Foreign Application Priority Data

Oct. 15, 2008 (KR) ........................ 10-2008-0101127

(51) Int. Cl.
*G02F 1/167* (2006.01)

(52) U.S. Cl.
USPC .......................................................... 345/107

(58) Field of Classification Search
None
See application file for complete search history.

(56) References Cited

U.S. PATENT DOCUMENTS

| | | | | |
|---|---|---|---|---|
| 6,828,955 | B2 * | 12/2004 | Yamamoto et al. | 345/107 |
| 7,839,381 | B2 * | 11/2010 | Zhou et al. | 345/107 |
| 2004/0001039 | A1 | 1/2004 | Shino et al. | |
| 2004/0075634 | A1 | 4/2004 | Gates | |
| 2005/0001812 | A1 * | 1/2005 | Amundson et al. | 345/107 |
| 2005/0104844 | A1 * | 5/2005 | Nakai et al. | 345/107 |
| 2006/0209011 | A1 | 9/2006 | Miyasaka | |
| 2007/0075963 | A1 * | 4/2007 | Zhou et al. | 345/107 |
| 2007/0080926 | A1 | 4/2007 | Zhou et al. | |
| 2007/0126693 | A1 * | 6/2007 | Johnson et al. | 345/107 |
| 2007/0139358 | A1 | 6/2007 | Sakamoto | |
| 2007/0182704 | A1 | 8/2007 | Hiramatsu | |
| 2007/0247417 | A1 | 10/2007 | Miyazaki et al. | |

FOREIGN PATENT DOCUMENTS

| | | |
|---|---|---|
| CN | 1853216 | 10/2006 |
| CN | 1882977 | 12/2006 |
| CN | 1885377 | 12/2006 |
| CN | 101063785 | 10/2007 |
| CN | 1658264 | 11/2011 |
| JP | 6-266309 | 9/1994 |
| JP | 7-175424 | 7/1995 |
| JP | 2000-035775 | 2/2000 |
| JP | 2003-195800 | 7/2003 |
| JP | 2007-316594 | 12/2007 |
| JP | 2010-072069 | 4/2010 |
| KR | 10-2007-0016108 | 2/2007 |
| KR | 10-2007-0076221 | 7/2007 |
| WO | WO 03/079323 | 9/2003 |
| WO | WO 2005/027088 | 3/2005 |

OTHER PUBLICATIONS

European Search Report dated Jan. 15, 2010.

(Continued)

*Primary Examiner* — Joseph Haley
(74) *Attorney, Agent, or Firm* — Harness, Dickey & Pierce, P.L.C.

(57) ABSTRACT

A pixel of a display apparatus includes at least a first transistor and at least a125 second transistor. A cell of transparent fluid including particles charged to have different polarities from each other is arranged between a pixel electrode and a common electrode. The first and second transistors are connected to the pixel electrode. The pixel is drivable according to pulse amplitude modulation (PAM) and pulse width modulation (PWM) such that a frame of an image is displayable using a single field.

33 Claims, 6 Drawing Sheets

(56) References Cited

OTHER PUBLICATIONS

Zehner, et al, "20.2: Drive Waveforms for Active Matrix Electrophoretic Displays", E Ink Corporation, 2003, pp. 842-845.

Feng, et al., "46.2: Real-Time Pen Tracking on Electronic Paper Displays", Ricoh Innovations, Inc., 2008, pp. 689-692.

Amundson, et al., "68.1: Invited Paper: Achieving Graytone Images in a Microencapsulated Electrophoretic Display", E Ink Corporation, 2006, pp. 1918-1921.

Chinese Office Action dated Jul. 8, 2013, issued in Chinese Application No. 200910206380.3.

Japanese Office Action dated Aug. 6, 2013, issued in Japanese Application No. 2009-237401 and English translation thereof.

* cited by examiner

DISPLAY APPARATUSES AND METHODS OF DRIVING THE SAME

CROSS-REFERENCE TO RELATED APPLICATION(S)

This non-provisional U.S. patent application claims priority under 35 U.S.C. §119 to Korean Patent Application No. 10-2008-0101127, filed on Oct. 15, 2008, in the Korean Intellectual Property Office, the disclosure of which is incorporated herein in its entirety by reference.

BACKGROUND

1. Field

The general inventive concept relates to display apparatuses and methods of driving the same. At least some example embodiments relate to electronic paper display apparatuses and methods of driving the same.

2. Description of the Related Art

Liquid crystal display (LCD) devices, plasma display panels (PDPs), and organic light emitting devices (OLEDs) are examples of related art display apparatuses. These related art display apparatuses use an additional light source (e.g., in the case of LCDs) or emit light themselves (e.g., in the case of PDPs and OLEDs) to display images. As a result, driving related art display apparatuses, such as LCDs, PDPs, or OLEDs, results in relatively high power consumption.

Electronic paper (e-paper) display apparatuses have been suggested as an alternative to the above-described related art display apparatuses. An electronic paper display apparatus is a reflective-type display apparatus that need not include an additional light source, and thus, has relatively low power consumption.

Electronic paper display apparatuses generally include two types of fine particles charged to opposite electrical polarities arranged between two electrodes. For example, an electronic paper display apparatus may include black particles and white particles. The black particles may be charged to have a negative polarity and the white particles may be charged to have a positive polarity. In this example, when a positive voltage is applied to the electrode located on a display surface, the black particles are drawn to the display surface, whereas the white particles are forced away from the display surface. As a result, black color is displayed on a screen.

In an electronic paper display apparatus, a previous state may be maintained by an internal balance between the positively charged particles the negatively charged particles. Accordingly, an electronic paper display apparatus may maintain a previous image even when a voltage is not applied.

SUMMARY

One or more example embodiments provide display apparatuses having improved response speeds, and methods of driving the same.

At least one example embodiment provides a display apparatus. The display apparatus may include a plurality of pixels. Each of the plurality of pixels may include a cell having particles charged to have different polarities from each other. Each of the plurality of pixels may further include a first transistor and a second transistor. The first transistor may be configured to adjust a magnitude of a voltage applied to the cell. The second transistor may be configured to adjust a period during which the voltage is applied to the cell.

According to at least some example embodiments, when the first transistor is turned on, a potential difference between both ends of the cell is generated so that the charged particles move in the cell. When the second transistor is turned on, the electric potential at each end of the cell is equalized or substantially equalized so that the charged particles stop moving in the cell. The voltage applied to the cell and a difference between the switching times of the first and second transistors may be determined according to a gray level to be represented by the corresponding pixel.

According to at least some example embodiments, each of the plurality of pixels may further include a capacitor. The capacitor may be charged when the first transistor is turned on, but discharged when the second transistor is turned on.

At least one other example embodiment provides a display apparatus. The display apparatus may include a first electrode, a second electrode, and a cell disposed between the first and second electrodes. The cell may include particles charged to have different polarities from each other. The display apparatus may further include a first transistor, a second transistor, and a capacitor, each of which may be electrically connected to the second electrode.

According to at least some example embodiments, drains of the first and second transistors may be electrically connected to the second electrode. An end (or terminal) of the capacitor may be electrically connected to the second electrode, and another end (or terminal) of the capacitor may be electrically connected to ground. The capacitor may be charged when the first transistor is turned on, and discharged when the second transistor is turned on.

According to at least some example embodiments, the display apparatus may further include a source driving unit connected to a source of the first transistor and a first gate driving unit connected to a gate of the first transistor. A second gate driving unit may be connected to a gate of the second transistor. A control unit may be configured to control operations of the source driving unit, the first gate driving unit, and/or the second gate driving unit.

According to at least some example embodiments, the first gate driving unit may switch the first transistor according to control of the control unit, and the second gate driving unit may switch the second transistor according to the control of the control unit. The source driving unit may generate a driving voltage according to the control of the control unit and apply the generated driving voltage to the source of the first transistor. A magnitude of the driving voltage generated by the source driving unit and a difference between the switching times of the first and second transistors may be determined by the control unit according to a gray level that is to be represented. The control unit may refer to a correlation between the gray level that is to be represented when determining the driving voltage and the switching times. The correlation may be recorded in advance.

At least one other example embodiment provides a method of driving a display apparatus. According to at least this example embodiment, a magnitude of a voltage applied to a cell may be adjusted. A period during which the voltage is applied to the cell may also be adjusted. The cell may include particles charged to have different polarities.

According to at least some example embodiments, when a first transistor that is electrically connected to a pixel electrode of the cell is turned on, a potential difference between ends of the cell may be generated so that the charged particles move in the cell. When a second transistor that is electrically connected to the pixel electrode of the cell is turned on, the electric potential at each end of the cell may be equalized or substantially equalized so that the charged particles in the cell stop moving.

According to at least some example embodiments, the first transistor may be in an on state while charging a capacitor that is electrically connected to the cell. The first transistor may be turned off when charging of the capacitor is complete.

The second transistor may be in the on state while the capacitor is discharged, and the second transistor may be turned off when discharging of the capacitor is complete. The magnitude of voltage applied to the cell and the period during which the voltage is applied to the cell may be determined by the control unit according to a gray level to be represented.

According to at least some example embodiments, before displaying an image of a frame in the display apparatus, an initialization process may be performed. During the initialization process, an alternating current (AC) voltage may be applied to each end of a cell in a state where the first transistors of each pixel in the display apparatus are turned off and the second transistors of each pixel are turned on.

At least one other example embodiment provides a display apparatus including at least one pixel. Each of the at least one pixels may include a cell, a first transistor and a second transistor. The cell may have particles charged to have different polarities. The first transistor may be configured to adjust a magnitude of a potential difference between ends of the cell. The second transistor may be configured to adjust a period during which the potential difference exists between the ends of the cell.

According to at least one other example embodiment, a display apparatus includes at least one pixel. Each of the at least one pixels includes a cell having particles charged to have different polarities from each other, and a transistor circuit. The transistor circuit may be configured drive the pixel to display a desired gray level using a single field of a frame image, independent of a number of gray levels in the image of the frame.

According to at least one other example embodiment, a display apparatus includes at least one pixel. Each of the at least one pixels may include a cell and a transistor circuit. The cell may be arranged between a pixel electrode and a common electrode. The cell may have particles charged to have different polarities from each other. The transistor circuit may include at least two transistors configured to drive the at least one pixel by modulating an amplitude and width of at least one voltage pulse applied to the pixel electrode.

According to at least some example embodiments, the pixel electrode may include a first and second pixel electrode arranged at a first end of the cell. The at least two transistors may include a first set of transistors and a second set of transistors. The first set of transistors may be electrically connected to the first pixel electrode, whereas the second set of transistors may be electrically connected to the second pixel electrode. The first set of transistors may be configured to modulate an amplitude and width of a first of the at least one pulse voltages applied to the first pixel electrode. The second set of transistors may be configured to modulate an amplitude and width of a second of the at least one pulse voltages applied to the second pixel electrode. The voltages applied to the first and second pixel electrodes drive the pixel.

According to at least one other example embodiment, in a method of driving a display apparatus having at least one pixel, the at least one pixel may be driven to obtain at least one gray level by modulating both amplitude and width of a pulse voltage applied to the at least one pixel. The at least one pixel may include a cell having particles charged to have different polarities.

According to at least one other example embodiment, in a method of driving a display apparatus, the display apparatus may be driven to form an image of a frame using a single field. The display apparatus may form the image of the frame using the single field and independent of a number of gray levels in the image of the frame. The display apparatus may include a plurality of pixels, each of the plurality of pixels including a cell. Each cell may include particles charged to have different polarities.

According to at least one other example embodiment, a display apparatus includes a plurality of pixels configured to form an image of a frame using a single field. The plurality of pixels form the image of the frame using the single field and independent of a number of gray levels in the image of the frame. Each of the plurality of pixels may include a cell. Each cell may include particles charged to have different polarities.

BRIEF DESCRIPTION OF THE DRAWINGS

The general inventive concept will become apparent and more readily appreciated from the following description of example embodiments, taken in conjunction with the accompanying drawings of which.

DETAILED DESCRIPTION

Figure 1A:
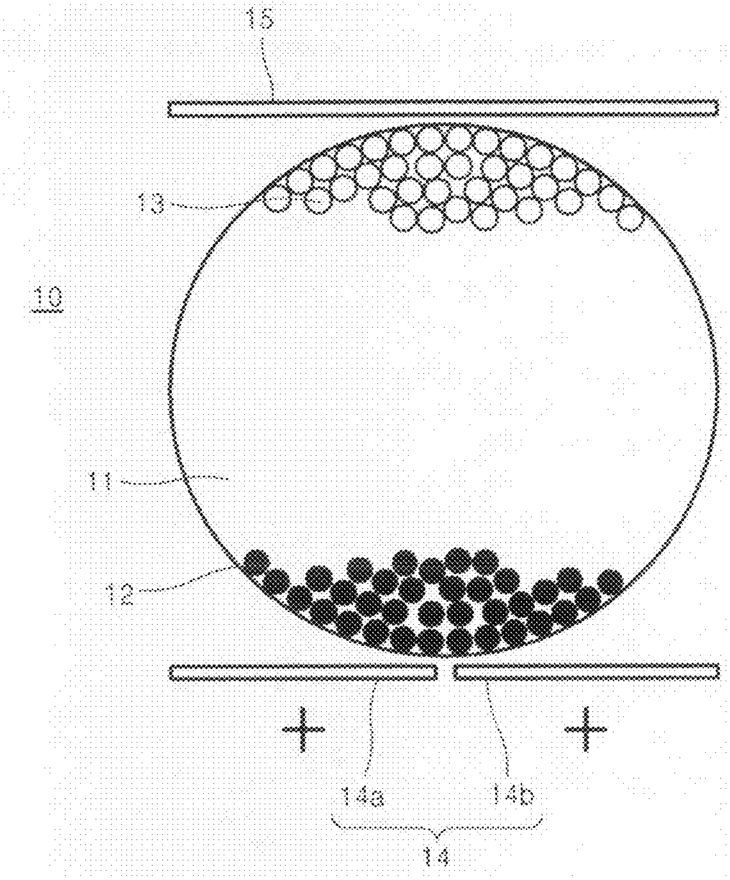
FIGS. 1A through 1C are schematic cross-sectional views of a portion of a pixel of an electronic paper display apparatus for illustrating operating principles of an electronic paper display apparatus according to an example embodiment.

Reference will now be made in detail to example embodiments illustrated in the accompanying drawings, wherein like reference numerals refer to the like elements throughout. In this regard, the general inventive concept may have different forms and should not be construed as being limited to the descriptions set forth herein. Accordingly, the example embodiments are merely described below, by referring to the figures, to explain aspects of the general inventive concept.

Various example embodiments will now be described more fully with reference to the accompanying drawings.

Detailed illustrative example embodiments are disclosed herein. However, specific structural and functional details disclosed herein are merely representative for purposes of describing example embodiments. The general inventive concept may, however, be embodied in many alternate forms and should not be construed as limited to only the example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments are to cover all modifications, equivalents, and alternatives falling within the scope of the general inventive concept. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1B:
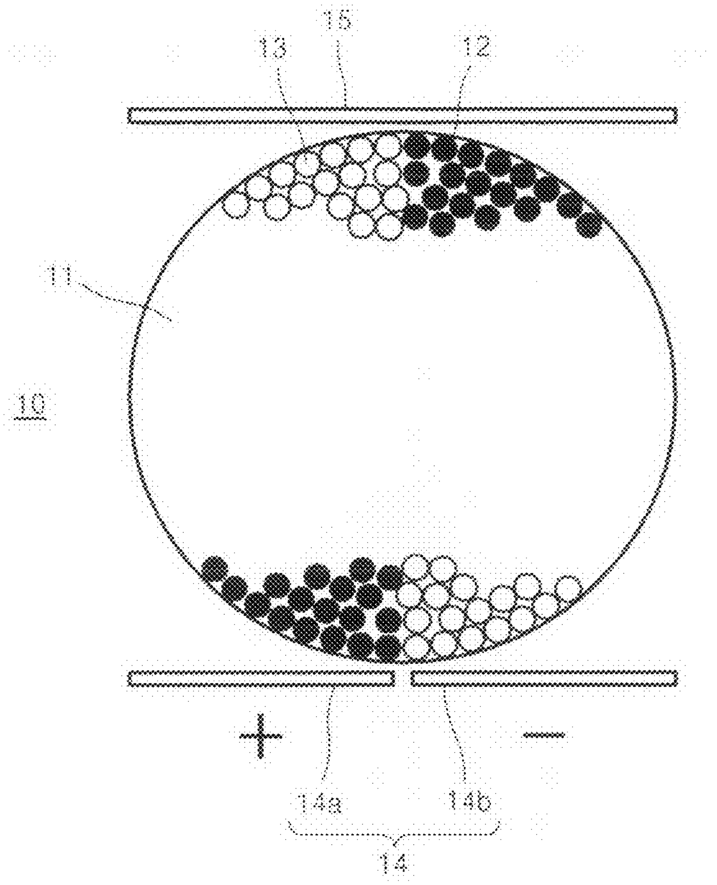
Figure 1C:
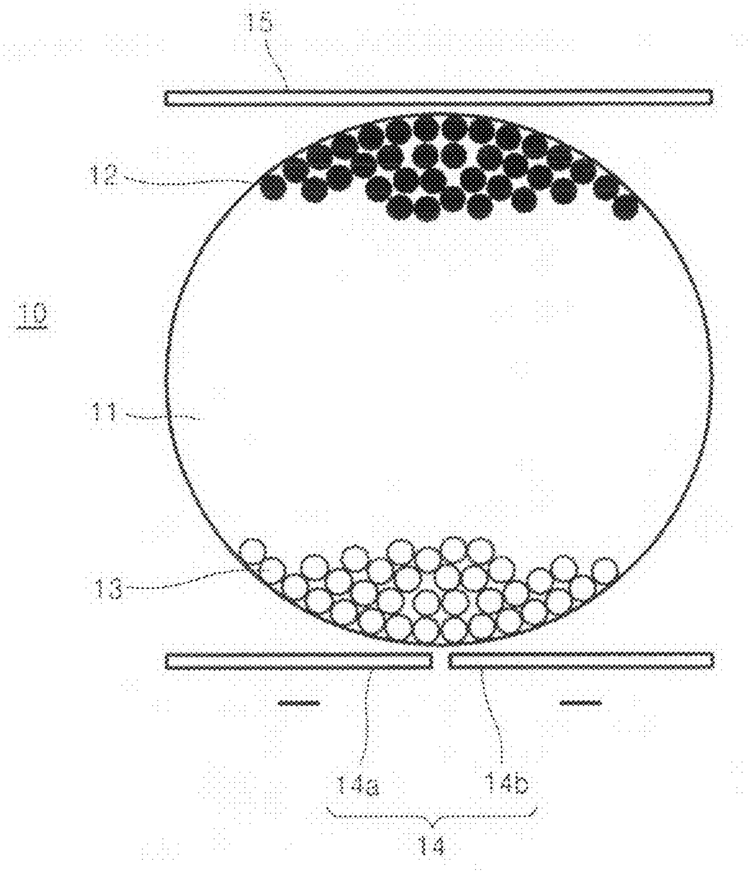

FIGS. 1A through 1C are cross-sectional views illustrating general principles for operating an electronic paper display apparatus according to an example embodiment. FIGS. 1A through 1C illustrate a portion of a pixel of a display apparatus according to an example embodiment.

Referring to FIGS. 1A through 1C, a pixel 10 may include: a common electrode 15; a pixel electrode 14; and a cell of transparent fluid 11 arranged between the common electrode 15 and the pixel electrode 14. The cell of transparent fluid 11 may include two kinds or types of fine particles 12 and 13. The two types of fine particles 12 and 13 may move in the cell of transparent fluid 11. The fine particles 12 and 13 may be charged to have opposite (positive and negative) polarities. For example, negatively charged first fine particles 12 may be black, whereas positively charged second fine particles 13 may be white. Hereinafter, example embodiments will be described assuming that the negatively charged particles are black and the positively charged particles are white. However, example embodiments are not limited thereto. Rather, the above setting may be changed according to selection by a designer.

Still referring to FIGS. 1A-1C, the common electrode 15 arranged toward an observer may be a transparent electrode that transmits light. The pixel electrode 14 may be arranged opposite to the common electrode 15. The pixel electrode 14 may include a first pixel electrode 14*a* and a ,second pixel electrode 14*b*. The pixel electrode 14 need not be transparent. Although not shown in FIGS. 1A-1C, an associated circuit may be further arranged under the pixel electrode 14 to selectively apply voltages (or voltage pulses) to the pixel electrode 14.

As shown in FIG. 1A, when a positive voltage is applied to both the first and second pixel electrodes 14*a* and 14*b*, the negatively charged first particles 12 gather around (or near) the pixel electrode 14, whereas the positively charged second particles 13 gather around (or near) the common electrode 15. As a result, the pixel 10 displays (and the observer, e.g., a user) sees white reflective light through the common electrode 15.

As shown in FIG. 1B, when a positive voltage is applied to the first pixel electrode 14*a* and a negative voltage is applied to the second pixel electrode 14*b*, the first and second particles 12 and 13 may gather evenly (or substantially evenly) around (or near) the pixel electrode 14 and the common electrode 15. As a result, the pixel 10 displays a gray color. Only one gray color is discussed with regard to the example shown in FIG. 1B. However, a plurality of gray levels may be realized by controlling the driving voltage applied to the electrodes 14 and/or 15.

As shown in FIG. 1C, when a negative voltage is applied to the first and second pixel electrodes 14*a* and 14*b*, the negatively charged first particles 12 gather around (or near) the common electrode 15, whereas the positively charged second particles 13 gather around (or near) the pixel electrode 14. As a result, the pixel 10 displays black color.

FIGS. 1A-1C illustrate a portion of a representative pixel of an electronic paper display apparatus. An electronic paper display apparatus according to example embodiments may include plurality of pixels arranged in an array. Each of the plurality of pixels may include a cell and associated electrodes as shown in FIGS. 1A-1C.

In electronic paper display apparatuses according to example embodiments, the gray level of the pixels may be adjusted in at least two ways including, for example, pulse amplitude modulation (PAM) and pulse width modulation (PWM). When using PAM, a magnitude of the driving voltage (e.g., driving voltage pulses) is adjusted appropriately according to the desired gray level, while a pulse width of the driving voltage remains constant or substantially constant. When using PWM, the period (or pulse width) of the applied driving voltage is adjusted according to the desired gray level, while the magnitude of the driving voltage remains constant or substantially constant.

An electronic paper display apparatus driven using the PWM method will now be described in more detail.

An image of a frame includes a plurality of fields. The number of fields may be equal to the number of gray levels (or colors) required for the image of the frame. In one example, the plurality of fields are displayed sequentially to display the image of a frame on the electronic paper display apparatus.

Figure 2:
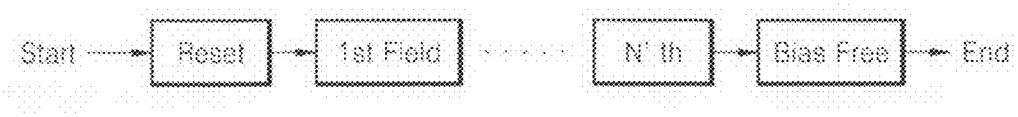
FIG. 2 is a schematic diagram illustrating a method of driving the electronic paper display apparatus using pulse width modulation (PWM)

FIG. 2 schematically illustrates an order of processes for driving an electronic paper display apparatus using PWM according to an example embodiment.

As shown in FIG. 2, when the image display begins, the screen is reset to black or white. If the entire screen is reset to black in the reset process, bright colors may be displayed by applying voltages to each pixel while passing through N fields, where N corresponds to the number of colors or gray levels in an image of a frame. For example, the voltage representing white color may be applied to a pixel for all of the N fields to generate a white color in the pixel. For each pixel, the greater number of fields during which a voltage representing white color is applied, the lighter the gray color displayed by the pixel. After completely configuring the image of a frame, a given, desired or predetermined vibration pulse is applied to the pixel to remove the remaining voltage in the pixel (Bias Free). In one example, when there are four gray levels (e.g., black, dark gray, light gray, and white), the image of the frame includes four fields in the PWM method.

Figure 3:
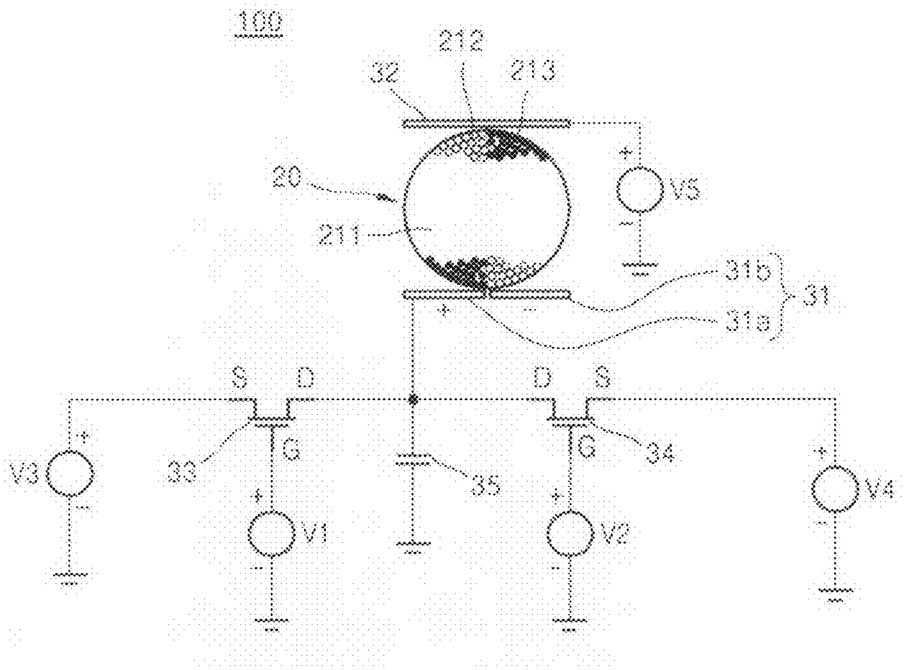
FIG. 3 is a schematic diagram showing a pixel of an electronic display apparatus according to an example embodiment.

According to at least one example embodiment, the PWM method and the PAM method may be utilized together (e.g., concurrently) to drive an electronic paper display apparatus. In doing so, an electronic display apparatus may display a frame of an image using only a single field, regardless or independent of the number of gray levels required to display the image. FIG. 3 schematically shows a pixel 100 of an electronic paper display apparatus configured to be driven using both PWM and PAM according to an example embodiment.

Referring to FIG. 3, a pixel 100 includes a cell 20; a common electrode 32; a pixel electrode 31; and an associated circuit. The cell 20 is arranged between the common electrode 32 and the pixel electrode 31. As shown in FIG. 3, the electrodes 31 and 32 may be arranged at opposite sides (or ends) of the cell 20. For example, pixel electrode 31 may be arranged at a lower surface or portion of the cell 20, whereas common electrode 32 may be disposed at an upper surface or portion (e.g., toward an observer) of the cell 20.

The cell 20 includes transparent fluid 211 and two kinds or types of fine particles 212 and 213. The fine particles 212 may be charged to have a different polarity from the fine particles 213, and may move within the cell 20. The fine particles 212 and 213 may be different colors as described above. For example, the first fine particles 212 may be white and the second fine particles 213 may be black. However, the second fine particles 213 may be red, green, blue, a combination thereof, or any other color or combination of colors other than black. Moreover, according to this example embodiment, the fine particles 212 are positively charged, whereas the second fine particles 213 are negatively charged. However, example embodiments are not limited thereto.

Still referring to FIG. 3, the pixel electrode 31 includes a first pixel electrode 31*a* and a second pixel electrode 31*b*. However, example embodiments are not limited thereto. The number of pixel electrodes 31 corresponding to the cell 20 may be selected optionally. The common electrode 32 may be a transparent electrode, but the pixel electrode 31 need not be transparent.

The pixel 100 further includes a circuit connected to the pixel electrode 31. The circuit controls the voltage applied to the pixel electrode 31. The circuit may include at least two transistors (e.g., thin film transistors (TFTs) or other switching devices) and a capacitor electrically connected to the first pixel electrode 31*a*. Each of the at least two transistors, the capacitor and the pixel electrode 31*a* may be connected (e.g., directly connected) to one another at a common node. As shown in FIG. 3, for example, the circuit includes a first thin film transistor (TFT) 33, a second TFT 34, and a capacitor 35 electrically connected to the first pixel electrode 31*a*.

In the example embodiment shown in FIG. 3, a first electrode (or terminal) of the capacitor 35 is connected to the first pixel electrode 31*a*, whereas the other electrode (or terminal) of the capacitor 35 is connected to ground. The drain D of the first TFT 33 is connected to the first pixel electrode 31*a*. The source S of the first TFT 33 is connected to a corresponding electric power source configured to generate a voltage V3. The gate G of the first TFT 33 is connected to an electric power source configured to generate a switching voltage V1. The drain D of the second TFT 34 is also connected to the first pixel electrode 31*a*, and the source S of the second TFT 34 is connected to a corresponding electric power source configured to generate a voltage V4. The gate G of the second TFT 34 is connected to an electric power source configured to generate a switching voltage V2. The common electrode 32 is connected to an electric power source configured to supply a voltage V5.

As discussed in more detail below with respect to FIG. 6, the electric power sources configured to generate voltages V1 and V2 may be gate driving units, and the electric power source configured to generate voltage V3 may be a source driving unit. Moreover, although not shown in FIG. 3 (but shown in FIG. 6), the second pixel electrode 31*b* may be connected to a circuit that is similar to or the same as the circuit connected to the first pixel electrode 31*a*. In FIG. 3, this circuit is omitted for the sake of clarity.

In FIG. 3, the electric power source configured to generate switching voltage V1 generates switching voltage V1 for switching the first TFT 33 ON and OFF. The electric power source configured to generate switching voltage V2 generates switching voltage V2 for switching the second TFT 34 ON and OFF. The electric power source configured to generate voltage V3 generates a voltage V3, which is applied to the pixel 100 to drive the pixel (and electronic paper display apparatus) in accordance with the PAM method. The electric power source configured to generate voltage V4 generates a reference voltage V4 to equalize or substantially equalize the potential difference between the electrodes 31*a* and 32 when voltage V5 is applied to the common electrode 32.

Figure 4:
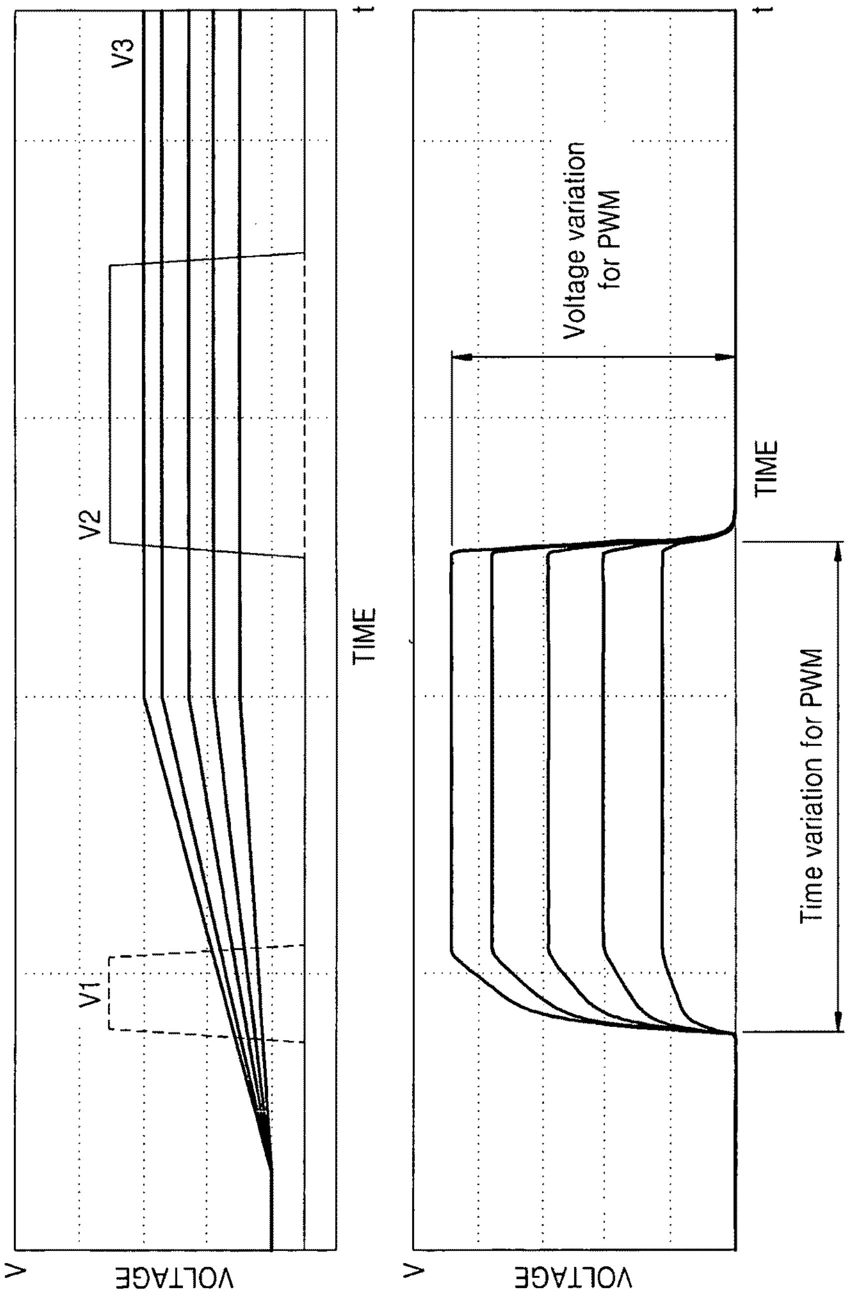
FIG. 4 is a timing diagram illustrating a method of driving the pixel shown in FIG. 3.

FIG. 4 is a timing diagram illustrating a method of driving the pixel 100 shown in FIG. 3. The upper graph in FIG. 4 shows an application order of the voltages V1, V2, and V3, and the lower graph in FIG. 4 shows the voltage applied to the pixel 100. In FIG. 4, it is assumed that the reference voltage V4 and the voltage V5 applied to the common electrode 32 are about 0V or ground. However, in at least some example embodiments, the source S of the second TFT 34 and the common electrode 32 may be connected to respective electric power sources. In this example, the reference voltage V4 and the voltage V5 applied to the common electrode 32 may be greater than about 0V and may be equal or substantially equal to each other.

Referring to FIGS. 3 and 4, when the switching voltage V1 is applied to the gate G of the first TFT 33, the first TFT 33 turns on. The pixel electrode 31*a* then charges to voltage V3, and voltage V3 is induced in the capacitor 35. When the capacitor 35 is fully charged, the application of the switching voltage V1 is stopped, thereby turning the first TFT 33 off. As a result, the voltage V3 is no longer induced in the capacitor 35. However, because the capacitor 35 is fully charged, the voltage V3 is continually applied (maintained) at the pixel electrode 31*a*. Thus, according to at least this example embodiment, the voltage V3 is applied to the pixel electrode 31*a* even after the TFT 33 is turned off. Because the common electrode 32 on the upper portion of the cell 20 is connected to ground and the pixel electrode 31*a* is at voltage V3, a potential difference is created (generated) between the electrodes 31*a* and 32. The potential difference may be as much as, for example, the magnitude of voltage V3. As a result of the potential difference, the charged particles 212 and 213 in the cell 20 move thereby changing the gray level of the pixel 100.

The above discussion focuses on voltages applied to the pixel electrode 31*a*. However, voltages may be applied to the pixel electrode 31*b* in a similar or substantially similar manner simultaneously or concurrently with the voltages applied to the pixel electrode 31*a* to obtain a desired gray level. For the sake of brevity, however, a detailed discussion will be omitted.

Still referring to FIGS. 3 and 4, when the pixel 100 reaches the desired gray level, the second TFT 34 is turned on by applying switching voltage V2 to the gate G of the second TFT 34. Because the source S of the second TFT 34 is connected to ground in this example, the capacitor 35 begins to discharge thereby decreasing the voltage at pixel electrode 31*a*. After the capacitor 35 is completely discharged, the application of the switching voltage V2 is stopped to turn the second TFT 34 off. The voltage of 0V is maintained in the capacitor 35 that is completely discharged and also the pixel electrode 31*a*. Consequently, there is little or no potential difference between the electrodes 31*a* and 32, and the movement of the charged particles 212 and 213 in the cell 20 slows and/or stops. According to at least this example embodiment, the capacitor 35 is charged and discharged via different circuit paths.

In another example embodiment, voltage V5 rather than ground (or 0V) may be applied to the common electrode 32. In this case, a potential difference equal or substantially equal to a difference between the voltages V3 and V5 may be generated between the electrodes 31 and 32 of the pixel 100. When the pixel 100 reaches the desired gray level, the switching voltage V2 is applied to the gate G of the second TFT 34 as discussed above. But, in this example embodiment voltage V4 rather than ground (or 0V) is applied to the source S of the second TFT 34 to charge (or discharge) the capacitor 35 to voltage V4. If the reference voltage V4 applied to the source S of the second TFT 34 is equal or substantially equal to the voltage V5 applied to the common electrode 32, little or no potential difference exists between electrodes 31 and 32. As a result, movement of the charged particles 212 and 213 slows and/or stops.

According to the above example embodiment, the magnitude of the voltage applied to the pixel 100 may be adjusted according to the magnitude of the voltage V3. And, the period during which the voltage is applied to the pixel 100 may be adjusted according to the difference between the time at which switching voltage V1 is applied and the time at which switching voltage V2 is applied. Therefore, electronic paper display apparatuses according to example embodiments may be driven using both the PAM method and the PWM method. In this example, the magnitude of voltage V3 and/or the difference between the time at which switching voltages V1 and V2 are applied may vary depending on the desired gray level.

For example, when the pixel 100 displays black color at an initial stage, the magnitude of voltage V3 may be set higher when a brighter level of gray color is desired. To display white color, for example, the voltage V3 may be set to a maximum. The time when the switching voltage V2 is applied may be adjusted to maintain voltage V3 for a longer or shorter period such that the desired gray level is displayed more accurately. For example, in a state where the voltage V3 is applied to the pixel 100, switching voltage V2 is applied to the second TFT 34 to discharge the capacitor 35 and stop the voltage from being applied to the pixel 100 when the pixel 100 reaches the desired gray level. By utilizing PAM and PWM, the pixel 100 may display a more accurate gray color level.

In this example, although the magnitude of the voltage V3 (e.g., the pulse amplitude) and the voltage application period (e.g., the pulse width) change according to the desired gray level, the relationship between the gray level, the magnitude and the pulse width of voltage V3 may not be linear. The relationship may differ according to characteristics (e.g., mobility and/or hysteresis properties) of the pixel 100. Therefore, the magnitude and the pulse width of voltage V3 may be determined according to (or based on) the desired gray level and the characteristics (e.g., mobility and/or hysteresis properties) of the material used in the pixel 100.

As described above, electronic paper display apparatuses according to example embodiments may use both a PAM method (in which the pulse amplitude changes according to the desired gray level) and a PWM method (in which the pulse width changes according to the desired gray level). When the electronic paper display apparatus is driven in the PWM method only, the number of required fields is equal to the number of gray levels used to configure the image of a frame. However, according to at least one example embodiment, the image of one frame may be realized using one field because the PAM method is also utilized.

Electronic paper display apparatuses according to example embodiments may be driven to obtain desired gray levels by modulating both amplitude and width of pulse voltages applied to pixels of the display apparatuses.

Figure 5:
FIG. 5 is a schematic diagram illustrating an order of processes for driving an electronic paper display apparatus according to an example embodiment.

FIG. 5 schematically illustrates an order of driving an electronic paper display apparatus according to an example embodiment.

Referring to FIG. 5, when the image display starts, the entire screen of the electronic paper display apparatus may be reset to black or white. Subsequently, different voltages may be applied to each of the pixels (e.g., pixel 100 in FIG. 3) of the electronic paper display apparatus in accordance with the PAM method. The periods during which the voltages are applied to the pixels may also be adjusted according to the PWM method. The desired gray level of each pixel may be displayed using only a single field. After forming the image of a frame using a single field, a given, desired or predetermined vibration pulse may be applied to the pixels to remove the remaining voltage in the pixels such that little or no potential difference exists between the electrodes at each end of each of the pixels (bias free).

Although not shown in FIG. 5, pixels may be initialized before displaying the image of a frame (e.g., before resetting the entire screen to black or white) such that the charged fine particles in the pixels move more easily.

With reference back to FIG. 3, during the above-described initialization process, each instance of the first TFT 33 may be turned off and each instance of the second TFT 34 corresponding to each pixel of the electronic paper display apparatus may be turned on. The common electrode 32 of each pixel 100 may be connected to the voltage V5 and the pixel electrode 31 of each pixel 100 may be connected to the voltage V4. In this state, the voltages V5 and V4 may be adjusted to apply an alternating current (AC) voltage to the pixel 100. For example, voltage V5 may be about 10V and voltage V4 may be about 0V at one point, and voltage V5 may be about 0V and voltage V4 may be about 10V at a subsequent point. When the AC voltage is applied to the pixel 100, the charged fine particles 212 and 213 in the cells 20 may move more easily. According to at least this example embodiment, all of the pixels 100 in the electronic paper display apparatus may be initialized concurrently or simultaneously in the manner described above.

Because the image of a frame may be displayed using only a single field according to at least some example embodiments, display and/or image conversion speeds may be improved as compared with related art electronic paper display apparatuses in which a plurality of fields are needed to form the image of one frame.

An electronic paper display apparatus driven using both the PAM method and the PWM method according to example embodiments may be suitable for displaying moving pictures. In the case of moving pictures, a difference between the gray levels of two continuous frames is relatively small. In the PWM method, even when the difference between the gray levels of the two continuous frames is relatively small, all fields from black color to white color are performed sequentially. Therefore, in the PWM method, the time for forming the image of a frame may be constant or substantially constant regardless of the difference between the gray levels of subsequent frames. However, in an electronic paper display apparatus using both the PAM and PWM, when the gray level is changed from the bright gray to the dark gray, for example, the image may be converted faster than a case where the gray level is changed from the black to white.

In addition, according to the PWM method, the number of fields used to configure a frame image is proportional to the number of gray levels. Thus, the time required to configure images increases as resolution increases. However, when the PWM method and the PAM method are used together to drive the electronic paper display apparatus, a frame image may be configured with a field regardless or independent of the increase in the number of gray levels. Therefore, the time required to configure relatively high resolution images (e.g., images representing a relatively large number of gray levels) may not increase, and the time for configuring the image may be maintained constant or substantially constant regardless or independent of the number of gray levels.

Moreover, when only the PWM method is used to drive an electronic paper display apparatus, a memory for storing each of the fields is required to configure an image of a frame. However, an electronic paper display apparatus operating according to both the PWM method and the PAM method does not require the memory because a frame may include only one field.

Figure 6:
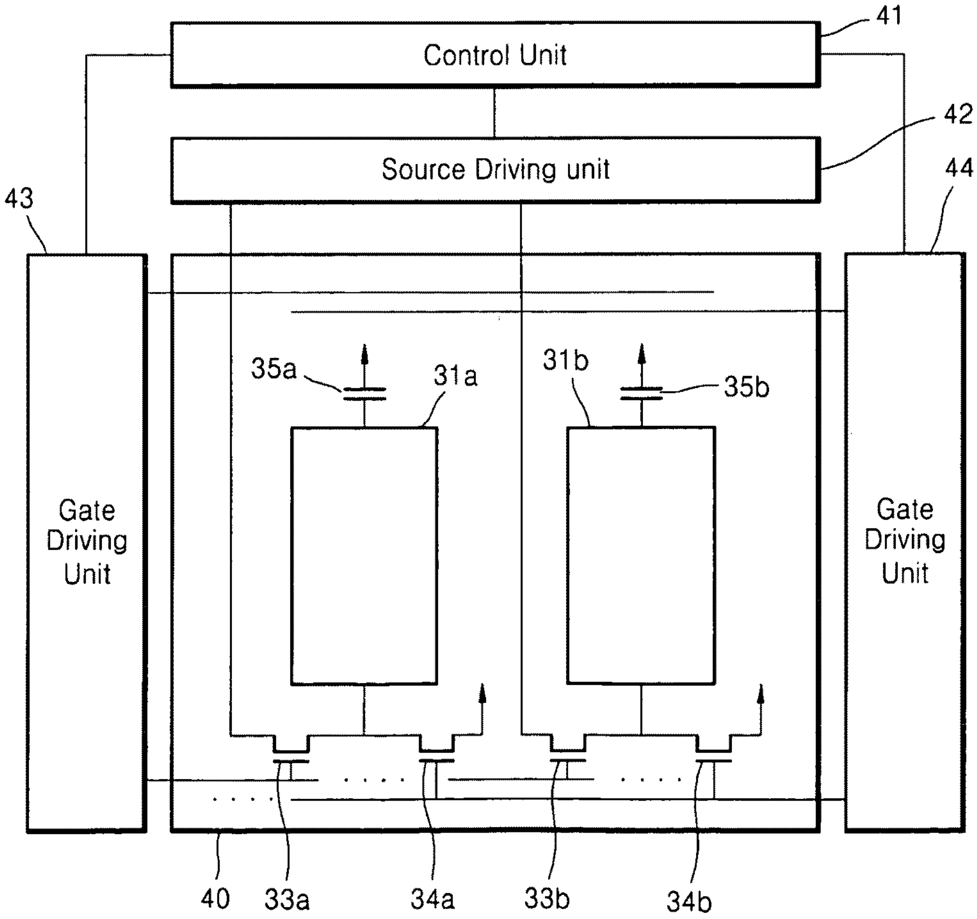
FIG. 6 is a schematic diagram of a circuit structure for driving an electronic paper display apparatus according to an example embodiment.

FIG. 6 schematically shows a circuit structure for driving an electronic paper display apparatus according to an example embodiment. In FIG. 6, a pixel 40 is represented as a rectangle for simplifying the representation. The common electrode 32 is omitted in FIG. 6 for the sake of convenience.

Referring to FIG. 6, the pixel 40 includes first and second pixel electrodes 31*a* and 31*b*. However, the number of pixel electrodes 31*a* and 31*b* is not limited thereto, and may be selected appropriately. As discussed above, an electronic display apparatus may include a plurality of pixels 40 arranged in a matrix array.

In FIG. 6, drains of the first and second TFTs 33*a* and 34*a* are connected to the first pixel electrode 31*a*. A first terminal of the capacitor 35*a* is also connected to the first pixel electrode 31*a*. The source of the second TFT 34*a* and a second terminal of the capacitor 35*a* are connected to ground.

Drains of the first and second TFTs 33*b* and 34*b* and a first terminal of the capacitor 35*b* are connected to the second pixel electrode 31*b*. The source of the second TFT 34*b* and a second terminal of the capacitor 35*b* are connected to ground.

A first gate driving unit (or circuit) 43 is connected to gates of the first TFTs 33*a* and 33*b*. The first gate driving unit 43 switches the first TFTs 33*a* and 33*b* on and off by applying a voltage (e.g., voltage V1 discussed above with regard to FIG. 3). A second gate driving unit (or circuit) 44 is connected to gates of the second TFTs 34*a* and 34*b*. The second gate driving unit 44 switches the second TFTs 34*a* and 34*b* on and off by applying a voltage (e.g., voltage V2 discussed above with regard to FIG. 3).

A source driving unit (or circuit) 42 is connected to sources of the first TFTs 33*a* and 33*b*. The source driving unit 42 generates a voltage (e.g., voltage V3 discussed above with regard to FIG. 3) to drive the pixel 40, and applies the generated voltage to the sources of the first TFTs 33*a* and 33*b*. The voltages applied to sources of each of the TFTs 33*a* and 33*b* may be the same or different, and may be of the same polarity or different polarities.

A control unit (or circuit) 41 may be connected to the source driving unit 42, the first gate driving unit 43, and the second gate driving unit 44. The control unit 41 analyzes the gray level to be represented by each pixel 40 according to the images to be displayed and controls operations of the source driving unit 42, the first gate driving unit 43, and the second gate driving unit 44 according to the desired gray level of each pixel 40. Under the control of the control unit 41, the first gate driving unit 43 generates signals for turning on TFT 33*a* and/or 33*b*, and the second gate driving unit 44 generates signals for turning on TFT 34*a* and/or 34*b*. The source driving unit 42 adjusts the voltage applied to TFT 33*a* and/or 33*b* according to the control of the control unit 42. The control unit 41 also determines the magnitude of voltage generated by the source driving unit 42 and the difference between the switching times of the first TFTs 33*a* and 33*b* and the second TFTs 34*a* and 34*b* according to the desired gray level of the pixel 40 and the characteristics (e.g., mobility and/or hysteresis properties) of the material used in the pixel 40. To do so, a correlation between the characteristics (e.g., mobility and/or hysteresis properties) of the material and the gray level may be recorded in the control unit 41 or in a recording unit or circuit (not shown). The control unit 41 may then determine the magnitude of voltage generated by the source driving unit 42 and the difference between the switching times of the first TFTs 33*a* and 33*b* and the second TFTs 34*a* and 34*b* according to the correlation, which may be recorded in advance.

FIG. 6 shows a structure in which the reference voltage V4 is about 0V. However, when the reference voltage V4 is not about 0V, an additional source driving unit or circuit (not shown) may be connected to sources of the second TFTs 34*a* and 34*b*.

Example embodiments described herein should be considered in a descriptive sense only and not for purposes of limitation. Descriptions of features or aspects within each example embodiment should typically be considered as available for other similar features or aspects in other example embodiments.

What is claimed is:

1. A display apparatus comprising:
at least one pixel, each of the at least one pixels including,
a cell having particles charged to different polarities,
a first transistor configured to modulate a magnitude of a potential difference between ends of the cell, and
a second transistor configured to adjust a period during which the potential difference exists between the ends of the cell.

2. The display apparatus of claim 1, wherein the magnitude and period of the potential difference are determined based on a gray level that is to be represented by the at least one pixel.

3. The display apparatus of claim 1, wherein the first transistor modulates the magnitude of the potential difference by applying a voltage to an end of the cell in response to a received first switching voltage, the received first switching voltage causing the first transistor to turn on.

4. The display apparatus of claim 3, wherein each of the at least one pixels further includes,
a capacitor configured to maintain the magnitude of the potential difference between the ends of the cell after the first transistor is turned off.

5. The display apparatus of claim 3, wherein the second transistor adjusts the period of the potential difference by equalizing electric potential at each end of the cell in response to a received second switching voltage, the second switching voltage causing the second transistor to turn on.

6. The display apparatus of claim 5, wherein the capacitor is further configured to charge when the first transistor is turned on, and discharge when the second transistor is turned on.

7. The display apparatus of claim 1, wherein the at least one pixel includes a plurality of pixels, the plurality of pixels being configured to display an image of a frame using a single field and independent of a number of gray levels in the image of the frame.

8. A display apparatus comprising:

at least one pixel, the at least one pixel including, a first electrode, a second electrode, a cell arranged between the first and second electrodes, the cell including particles charged to have different polarities from each other, a first transistor electrically connected to the second electrode, a second transistor electrically connected to the second electrode, and a capacitor electrically connected to the second electrode, the capacitor being configured to be charged when the first transistor is turned on, but discharged when the second transistor is turned on.

9. The display apparatus of claim 8, wherein drains of the first and second transistors are electrically connected to the second electrode.

10. The display apparatus of claim 8, wherein a first terminal of the capacitor is electrically connected to the second electrode, and a second terminal of the capacitor is electrically connected to ground.

11. The display apparatus of claim 8, further comprising:

a source driving unit connected to a source of the first transistor;

a first gate driving unit connected to a gate of the first transistor;

a second gate driving unit connected to a gate of the second transistor; and a control unit configured to control the source driving unit, the first gate driving unit, and the second gate driving unit.

12. The display apparatus of claim 11, wherein the first gate driving unit is configured to switch the first transistor according to control of the control unit, and the second gate driving unit is configured to switch the second transistor according to the control of the control unit.

13. The display apparatus of claim 12, wherein the source driving unit is configured to generate a driving voltage according to the control of the control unit and configured to apply the generated driving voltage to the source of the first transistor.

14. The display apparatus of claim 13, wherein the control unit is configured to determine a magnitude of the driving voltage generated by the source driving unit and a difference between switching times of the first and second transistors based on a gray level to be represented by the at least one pixel.

15. The display apparatus of claim 14, wherein the magnitude of the driving voltage and the difference between the switching times of the first and second transistors are correlated to the gray level.

16. The display apparatus of claim 8, wherein the at least one pixel includes a plurality of pixels, the plurality of pixels being configured to display an image of a frame using a single field and independent of a number of gray levels in the image of the frame.

17. A method of driving a display apparatus including a transistor circuit having at least two transistors, the transistor circuit being configured to drive a pixel of the display apparatus by modulating an amplitude and width of at least one voltage pulse applied to the pixel, the method comprising:

modulating a magnitude of a potential difference between ends of a cell of the pixel of the display apparatus, the cell having particles charged to have different polarities; and adjusting a period during which the potential difference exists between the ends of the cell.

18. The method of claim 17, wherein the modulating the magnitude includes, applying the at least one voltage pulse to the pixel by turning on a first of the at least two transistors, the first transistor being electrically connected to a pixel electrode of the pixel, and the potential difference between the ends of the cell causing the charged particles to move within the cell.

19. The method of claim 18, further comprising:

maintaining the potential difference between the ends of the cell after the first transistor is turned off.

20. The method of claim 17, wherein the adjusting the period includes, equalizing an electric potential at each end of the cell by turning on a second of the at least two transistors, the second transistor being electrically connected to the pixel electrode of the pixel, and the electric potential being equalized such that movement of the charged particles within the cell stops.

21. The method of claim 20, wherein the equalizing the electric potential includes, discharging a capacitor that is electrically connected to the pixel electrode of the pixel.

22. The method of claim 17, wherein the magnitude and period of the potential difference are adjusted according to a gray level to be represented by the pixel.

23. The method of claim 22, wherein the magnitude of the potential difference is adjusted by controlling an amplitude of a voltage applied to the pixel and the period of the potential difference is adjusted by controlling a period of the voltage applied to the pixel, wherein the gray level to be represented is correlated to the magnitude and the period of the applied voltage.

24. The method of claim 17, further comprising:

performing an initialization process in which an alternating current (AC) voltage is applied to both ends of the pixel.

25. The method of claim 17, wherein the modulating of the magnitude and the adjusting of the period drives the display apparatus using a single field and independent of a number of gray levels in an image of a frame.

26. An electronic paper display apparatus comprising:

a plurality of pixels configured to form an image of a frame using only a single field, each of the plurality of pixels including a cell having particles charged to have different polarities for forming the image, each of the plurality of pixels including, a transistor circuit having at least two transistors, the transistor circuit being configured to drive the pixel by modulating an amplitude and width of at least one voltage pulse applied to the pixel.

27. The electronic paper display apparatus of claim 26, wherein the plurality of pixels form the image of the frame using the single field and independent of a number of gray levels in the image of the frame.

28. The display apparatus of claim 26, wherein each of the plurality of pixels further includes, a cell having particles charged to have different polarities.

29. A display apparatus comprising:

at least one pixel, each of the at least one pixels including, a cell having particles charged to have different polarities from each other, and a transistor circuit including at least two transistors, the transistor circuit being configured to drive the at least one pixel by modulating an amplitude and width of at least one voltage pulse applied to the pixel electrode.

30. The display apparatus of claim 29, wherein the cell is arranged between a pixel electrode and a common electrode, the pixel electrode including, a first and second pixel electrode arranged at a first end of the cell, and wherein the at least two transistors includes, a first set of transistors and a second set of transistors, the first set of transistors being electrically connected to the first pixel electrode, and the second set of transistors being electrically connected to the second pixel electrode, the first set of transistors being configured to modulate an amplitude and width of a first of the at least one pulse voltages applied to the first pixel electrode, and the second set of transistors being configured to modulate an amplitude and width of a second of the at least one pulse voltages applied to the second pixel electrode.

31. A method of driving a display apparatus including at least one pixel, the at least one pixel including a transistor circuit having at least two transistors, the transistor circuit being configured to drive the at least one pixel by modulating an amplitude and width of pulse voltages applied to the at least one pixel, the method comprising:

driving the at least one pixel to obtain at least one gray level by modulating both the amplitude and the width of the pulse voltages applied to the at least one pixel, the at least one pixel including a cell having particles charged to have different polarities for forming the image.

32. A method of driving a display apparatus including a plurality of pixels, each of the plurality of pixels including a transistor circuit having at least two transistors, the transistor circuit being configured to drive a pixel by modulating an amplitude and width of at least one voltage pulse applied to the pixel, the method comprising:

driving the plurality of pixels to form an image of a frame using only a single field, each of the plurality of pixels including a cell having particles charged to have different polarities for forming the image.

33. The method of claim 32, wherein the display apparatus forms the image of the frame using the single field and independent of a number of gray levels in the image of the frame.

* * * * *